*A. Giraudat,*
*Scroll Sawing Machine.*
Nº 35,817.    Patented July 8, 1862.
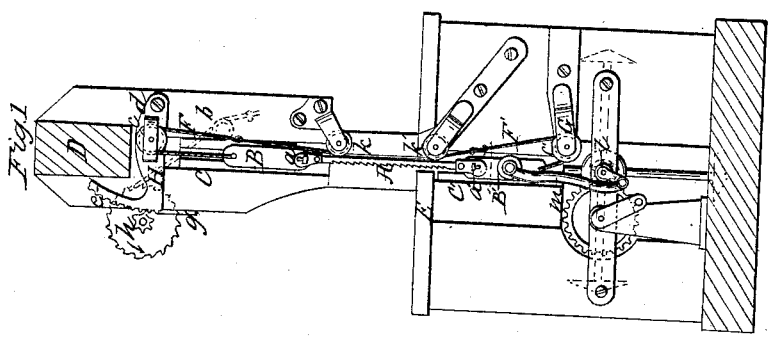
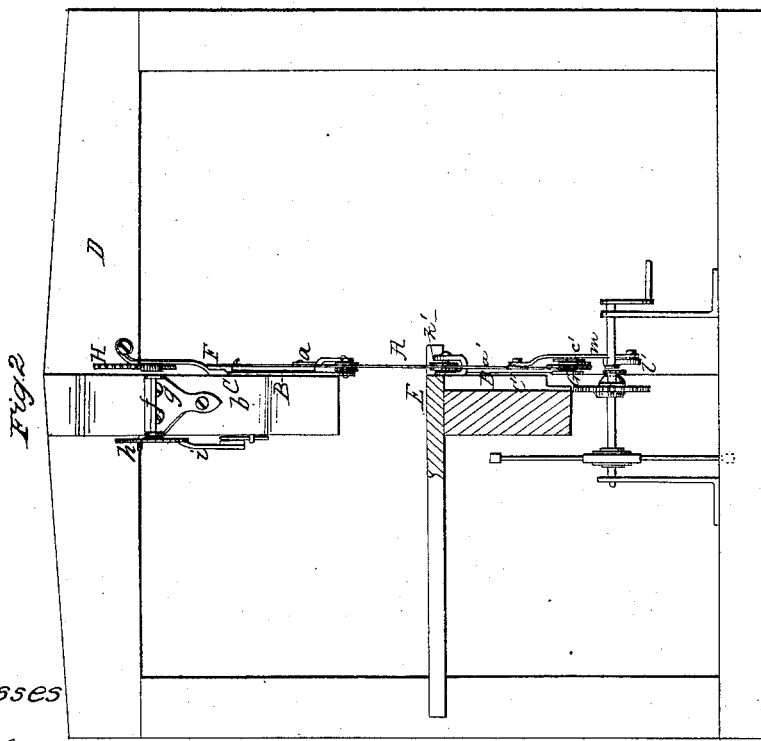
Witnesses    Inventor

UNITED STATES PATENT OFFICE.

A. GIRAUDAT, OF NEW YORK, N. Y.

IMPROVEMENT IN SCROLL-SAWS.

Specification forming part of Letters Patent No. 35,817, dated July 8, 1862.

*To all whom it may concern:*

Be it known that I, A. GIRAUDAT, of the city, county, and State of New York, have invented a new and Improved Scroll-Saw; and I do hereby declare that the following is a full, clear, and exact description of the same, reference being had to the accompanying drawings, forming a part of this specification, in which—

Figure 1 represents a sectional front elevation of my invention. Fig. 2 is a sectional side elevation of the same.

Similar letters of reference in both views indicate corresponding parts.

The object of this invention is to produce a scroll-saw which can be easily stretched, and which is hung so that the material to be cut can be turned freely in either direction; and it is intended as an improvement on that class of saws which are stretched by a tightening belt or chain.

The invention consists in the employment or use of a cord composed in whole or part of fine steel wire passing through the saw-kerf and close to the back of the saw, so as not to interfere with the motion of the work or material to be cut in any direction whatever, and at the same time to allow of straining the saw or inserting different blades with ease and facility.

To enable those skilled in the art to make and use my invention, I will proceed to describe its construction and operation with reference to the drawings.

The saw A is secured by means of catch-pins $a$ $a'$ to the sliding heads B B', which move up and down on the guides C C'. These guides are rigidly attached to the frame D, one above and one below the table E, on which the work is placed. It will be noticed that the upper guide, C, is fastened to a pendant, $b$, that does not extend down to the surface of the table, thus leaving sufficient room for turning the work or material to be sawed in either direction.

The saw is strained by means of a cord or chain, F, one end of which is secured to the head B and its other end to the head B', and which extends over two pulleys or rollers, $c$ $c'$. The roller $c'$ is attached to a forked arm, G, that is rigidly fastened to the frame D below the lower guide, C', and the roller $c$ is secured to a lever, H, that vibrates on a fulcrum pin, $d$, above the upper guide, C. The loose end of the lever H has a toothed segment, $e$, attached to it, and this segment gears into a pinion, $e'$, which is mounted on an arbor, $f$, that has its bearings in a frame, $g$, which is secured to the side of the pendant $b$. This arbor bears the ratchet-wheel $h$, the teeth of which engage with the spring-pawl $i$. By turning the ratchet-wheel $h$ in the direction of the arrow marked upon it in Fig. 1 the loose end of the vibrating lever H is forced upward, and the cord F, and with it the saw A, are strained. By this arrangement the tension of the saw can be adjusted at pleasure, and when once adjusted the spring-pawl $i$, by catching in the teeth of the ratchet-wheel, prevents the same turning backward and the saw retains the desired tension. If it is desired to take out one saw and put in another, the spring-pawl $i$ is forced back, so that by turning the ratchet-wheel in the direction opposite the arrow marked on the same the loose end of the lever H is moved down and the strain is taken off from the cord F. The saw can now be unhooked and replaced by another, and the tension is then adjusted according to the new blade.

It is obvious that if the cord F were made to run down on the side of the saw, or at some distance from its back, it would seriously interfere with the turning of the material to be cut. To obviate this difficulty two guide-pulleys, $k$ $k'$, are applied, one close under the table and the other at the lower extremity of the pendant $b$. By these two guide-rollers a portion of the cord of nearly the length of the saw is forced close up to its back, and that part of the cord which extends over the guide-pulleys $k$ $k'$ may be made of thin steel wire, so that the same interferes as little as possible with the motions of the work or material to be cut.

The saw receives its motion from a crank-shaft, $l$, the crank $l'$ of which connects with the lower head, B', by a pitman, $m$. A rapid rotary motion is imparted to said crank-shaft either by foot or any other motive power.

I do not claim as my invention the application of a tightening-belt to reciprocating saws; but,

Having thus fully described my invention, what I claim as new, and desire to secure by Letters Patent, is—

The employment or use of a cord, F, composed in whole or part of fine steel wire and so arrarnged as not to interfere with the motion of the work to be cut by passing it through the saw-kerf and close to the back of the saw, in the manner described.

A. GIRAUDAT.

Witnesses:
JAMES LAIRD,
R. GAWLEY.